United States Patent [19]

Tomalia et al.

[11] 4,357,464
[45] Nov. 2, 1982

[54] REMOVAL OF 2-ISOPROPENYL-2-OXAZOLINE MONOMER

[75] Inventors: Donald A. Tomalia; Timothy J. Adaway, both of Midland, Mich.

[73] Assignee: The Dow Chemical Company, Midland, Mich.

[21] Appl. No.: 254,246

[22] Filed: Apr. 15, 1981

[51] Int. Cl.$^3$ .............................................. C08F 6/10
[52] U.S. Cl. ...................................... 528/481; 526/260; 528/486; 528/487; 528/490; 548/215; 548/237
[58] Field of Search ................ 528/481, 486, 487, 490

[56] References Cited

U.S. PATENT DOCUMENTS

| | | | |
|---|---|---|---|
| 2,831,858 | 4/1958 | De Benneville et al. | 526/260 |
| 2,897,182 | 7/1959 | De Benneville et al. | 526/260 |
| 3,505,297 | 4/1970 | Sheetz et al. | 526/260 |
| 3,509,235 | 4/1970 | Reimhofer et al. | 525/172 |

OTHER PUBLICATIONS

CA, 68, 70273u.
*Advanced Organic Chemistry*, Carey and Sundberg, Part A, pp. 206–208 (1977).

*Primary Examiner*—Stanford M. Levin
*Attorney, Agent, or Firm*—Charles J. Enright

[57] ABSTRACT

The level of residual 2-isopropenyl-2-oxazoline monomer in polymers prepared therefrom can be reduced by reaction of the protonated salt of the monomer with a variety of nucleophiles. The products of the reaction with the monomer are much less toxic than the 2-isopropenyl-2-oxazoline and the utility of the polymer is thereby enhanced. The reaction product of 2-isopropenyl-2-oxazoline and $H_2SO_3$ is itself novel and useful.

8 Claims, No Drawings

REMOVAL OF 2-ISOPROPENYL-2-OXAZOLINE MONOMER

BACKGROUND OF THE INVENTION

This is a novel process for reducing the level of 2-isopropenyl-2-oxazoline in a polymer suspended in a liquid medium. In particular, a process is described whereby residual 2-isopropenyl-2-oxazoline monomer is scavenged from a polymer prepared from this monomer.

Numerous patents and articles teach the use of 2-isopropenyl-2-oxazoline to prepare homopolymers or other types of polymer. U.S. Pat. Nos. 2,831,858 and 2,897,182 teach the preparation of homopolymers and copolymers from 2-isopropenyl-2-oxazoline. U.S. Pat. No. 3,505,297 and W. German Patent No. 1,261,261 teach the preparation of other polymers utilizing 2-isopropenyl-2-oxazoline.

The prior art fails to teach how the level of residual 2-isopropenyl-2-oxazoline monomer can be reduced to safe levels in the polymers prepared therefrom. Because of the toxicity and relatively high vapor pressure unreacted 2-isopropenyl-2-oxazoline, the lack of an effective and economical technique for reducing the level of unreacted 2-isopropenyl-2-oxazoline in the finished polymer has hindered the commercial development of polymers prepared therefrom. The instant process provides a solution to these and other problems without deleteriously affecting the properties of the polymer.

SUMMARY OF THE INVENTION

According to this invention, the level of 2-isopropenyl-2-oxazoline monomer present in a polymer can be reduced by contacting at reactive conditions in a liquid medium the polymer containing 2-isopropenyl-2-oxazoline with a protic acid, H-X, so as to produce the corresponding 2-isopropenyl-2-oxazolinium salt. The 2-isopropenyl-2-oxazolinium salt is then reacted with a nucleophilic compound, H-M, so as to convert it to a compound corresponding to the formula

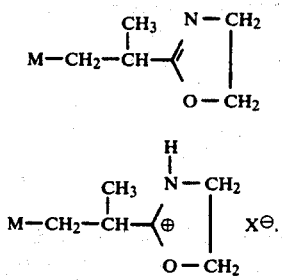

In Formula II, X is a compatible anion derived from the protic acid used to protonate the 2-isopropenyl-2-oxazoline.

Vinyl-addition polymers prepared by the reaction of 2-isopropenyl-2-oxazoline with itself or other ethylenically unsaturated monomers which are essentially free of 2-isopropenyl-2-oxazoline are believed to be novel compositions. The term "essentially free" is used herein to indicate that these polymers contain less than about 1 part per million by weight of the 2-isopropenyl monomer and salts of this monomer.

The novel compound corresponding to Formula II wherein M is $SO_3^{\ominus}$ is itself of interest. In this embodiment an inner salt is formed in which M is also the compatible anion.

DETAILED DESCRIPTION OF THE INVENTION

Removal of Residual 2-Isopropenyl-2-Oxazoline

2-Isopropenyl-2-oxazoline is a compound which is well-known in the prior art. Conveniently, 2-ethyl-2-oxazoline can be reacted with formaldehyde and the resulting 2-(α-hydroxymethyl)ethyl-2-oxazoline can be dehydrated in the presence of sodium hydroxide to prepare the 2-isopropenyl-2-oxazoline.

Polymers prepared by the vinyl addition polymerization of 2-isopropenyl-2-oxazoline with itself or with other ethylenically unsaturated compounds, such as styrene are likewise well-known in the art. Typically, polymerization is initiated with a free radical initiator. The vinyl addition polymerization can be effected in bulk, in solution or in emulsion. 2-Isopropenyl-2-oxazoline monomer can also be cured with or used to cure polycarboxylic acids, polymercaptans, Lewis acids, polyanhydrides or polyepoxides to prepare other types of polymers.

Polymers prepared from 2-isopropeny-2-oxazoline will typically contain from about 300 to about 2000 parts per million (ppm) of the 2-isopropenyl-2-oxazoline monomer by weight. It is difficult to prepare by conventional techniques, polymers which contain less than about 300 ppm of unreacted 2-isopropenyl-2-oxazoline by weight, even when reaction conditions are adjusted to minimize the unreacted monomer content. Volatile residual monomer from these polymers may result in undesirably high levels of 2-isopropenyl-2-oxazoline being present in confined spaces about these polymers.

It has been found that the residual 2-isopropenyl-2-oxazoline can be converted to less toxic products by reacting its protonated acid salt with a nucleophilic compound which will add across the double bond present in the isopropenyl moiety. Protonation of the oxazoline ring is conveniently achieved by addition of an effective amount of a protic acid to a liquid medium containing the 2-isopropenyl-2-oxazoline. Generally, it is desirable that a protic acid be present in sufficient amounts to protonate at least about 20 percent of the 2-isopropenyl-2-oxazoline present initially. The liquid medium is preferably aqueous, but operably can be an organic solvent which is inert to but dissolves the 2-isopropenyl-2-oxazoline, the acid and the nucleophile to be employed. The reaction can also be conducted neat.

Illustrative protic acids operable in the instant process include hydrochloric acid, sulfuric acid, phosphoric acid, $HBF_4$, and other mineral acids, as well as carboxylic acids, such as, acetic acid and oxalic acid. Generally, those protic acids having a pKa of less than about 12 are preferred, with those having a pKa of less than 8 being most preferred. Of course, pKa in this instance is used as a shorthand expression for the negative logarithm of the acid's dissociation constant. The preferred acids, such as sulfuric acid, do not lead to ring opening of pendant oxazoline groups on the polymer when used in small amounts which are effective to protonate from about 20 percent to about essentially all of the 2-isopropenyl-2-oxazoline monomer present.

Operable nucleophiles are those having a nucleophilic constant of at least about 5.0. The nucleophile is generally the conjugate base, $M^{\ominus}$, of the nucleophilic compound, H-M. The term nucleophilic constant is used herein in the conventional sense, i.e., the log of the rate of nucleophilic substitution of methyl iodide in menthanol at 25° C. minus the log of the rate of solvolysis under the same conditions. See, F. A. Carey and R. J. Sundberg, *Advanced Organic Chemistry, Part A*, pp. 206–208, Plenum Press (1977), for further elaboration and a tabulation of some nucleophilic constants.

Where the nucleophilic compound has a pKa of greater than about 12, it is necessary to use a separate protic acid to protonate the 2-isopropenyl-2oxazoline. Illustrative of such non-acidic nucleophilic compounds are lower alkanols, such as, methanol and ethanol, pyridine and alkylated pyridines, such as 4-methyl-pyridine and 2-alkyl-2-oxazolines, such as 2-ethyl-2-oxazoline and 2-methyl-2-oxazoline. Water itself is not suitable as a nucleophilic compound, because it reacts almost exclusively with the oxazoline ring itself to produce esters. The immediate product of the reaction of the non-acidic nucleophilic compound with the oxazolinium salt generally corresponds to a salt of Formula II. Since the non-acidic nucleophilic compound will react selectively with the double bond of only protonated 2-isopropenyl-2-oxazoline, it is desirable that essentially all of the 2-isopropenyl-2-oxazoline is protonated.

Where the nucleophilic compound has sufficient acid character (a pKa less than about 12 ), the nucleophilic compound itself can be used to produce the protonated 2-isopropenyl-2-oxazoline salt. Illustrative of such nucleophilic compounds are H$_2$S, HS—C$_2$H$_4$—SH, H$_2$SO$_3$, NaHSO$_3$, KHSO$_3$ and mercaptoethanol. Na$_2$S$_2$O$_3$ is also operable, as it generates a nucleophile in an aqueous medium. Hydrogen chloride is not very desirable as a necleophilic compound because it preferentially reacts with the oxazoline ring rather than with the isopropenyl moiety. Generally, unless a large excess of the acidic nucleophilic compound or a second protonating acid is used, the product of the reaction with an acidic nucleophilic compound will correspond to Formula I. If a separate acid is used for protonation, the product will correspond to Formula II.

It is preferred to use at least a 100 mole percent excess of the nucleophilic compound relative to the 2-isopropenyl-2-oxazoline present. However, the use of a stoichiometric amount of the nucleophilic compound is also operable. Most preferably, a 2 to 5 molar excess of the 2-isopropenyl-2-oxazoline is employed.

The temperature during both the protonation and reaction with the nucleophilic compound is not generally critical so long as the reactants and polymer are not deleteriously affected and the reaction medium remains liquid. Temperatures of from about 0° C. to about 125° C. are operable. A temperature of from about 10° C. to about 50° C. is most preferred for reasons of convenience.

The time necessary for substantially complete elimination of 2-isopropenyl-2-oxazoline from the polymer varies dependent on the characteristics of the polymer, the temperature, the nucleophile, the level of 2-isopropenyl-2-oxazoline and other factors. Typically, at 20° C. after from about 0.25 to about 24 hours of contact between the nucleophile and the protonated 2-isopropenyl-2-oxazoline, the level of 2-isopropenyl-2-oxazoline present in the polymer will be reduced by at least 90 percent. They polymer with reduced levels of isopropenyl oxazoline is useful in powder coating, curable latexes and thermoset resins. The polymer can be readily recovered from the reaction medium by distillation at reduced pressure.

The products of the instant reaction which correspond to Formulas I and II, generally hydrolyze at a pH less than 7 in an aqueous solution to ring opened products corresponding to Formula III.

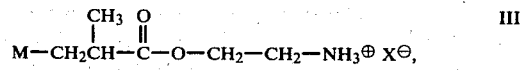

wherein X and M are defined hereinbefore. Both the products corresponding to Formulas I and II and their hydrolysis products have been found in inhalation, chronic exposure and ingestion studies to be considerably less toxic than the 2-isopropenyl-2-oxazoline.

Novel Inner Salt

The compound corresponding to Formula II wherein M is SO$_3$$^\ominus$ and the compound is an inner salt, i.e., "M" is the compatible anion "X", is itself of interest. This compound can be conveniently prepared by reacting 2-isopropenyl-2-oxazoline with H$_2$SO$_3$ in an aqueous solution in the manner herein described. Alternatively, the 2-isopropenyl-2-oxazoline can first be protonated with an acid such as sulfuric acid and then reacted with NaHSO$_3$ in an aqueous solution. The resulting inner salt can be readily isolated by distillation of the solvent at reduced pressure. This inner salt is useful as an initiator for the polymerization of 2-alkyl-2-oxazolines.

The aforementioned inner salt reacts with alkanols or alkyl mercaptans under mild, anhydrous conditions to compounds corresponding to the formula

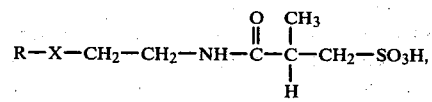

wherein R is an alkyl group derived from the alcohol or mercaptan and X is —O— or —S—. Where R is an alkyl group of from 7 to 20 carbon atoms, this ring opened product is useful as a surfactant.

This inner salt hydrolyzes slowly in the presence of water to a compound corresponding to Formula III wherein M is SO$_3$$^\ominus$. The hydrolysis product rearranges in a basic aqueous solution containing NaOH or KOH to a product of the formula

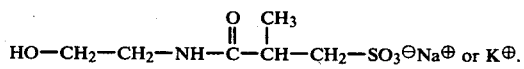

This latter compound will react with pendant isocyanate moieties on a polymer to provide anionic dye receptor sites.

The following examples are presented to illustrate the invention. All parts and percentages are by weight unless otherwise specified.

EXAMPLE 1

Gaseous sulfur dioxide was sparged through 2-isopropenyl-2-oxazoline vinyl-addition homopolymer containing 18 mole percent of residual monomer in an aqueous solution at 20° C. A slight temperature increase in the solution was observed indicating an exothermic reaction. The solution took on a yellow hue. Analysis of the solution by proton magnetic resonance and liquid chromatography, after the exotherm had subsided, indicated that substantially all of the 2-isopropenyl-2-oxazoline had been converted to an inner salt corresponding to Formula IV. In turn this inner salt was observed to slowly hydrolyze to a compound corresponding to Formula V. No opening of the pendant oxazoline groups on the polymer was detected.

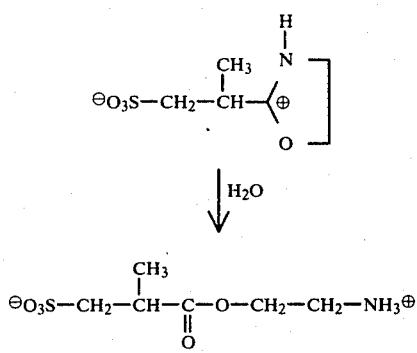

EXAMPLE 2

Gaseous hydrogen sulfide was sparged through an aqueous solution of 85 percent 2-isopropenyl-2-oxazoline at 20° C. An increase in the solution temperature was observed. Introduction of the H$_2$S was terminated after the exothermic reaction ceased. Analysis of the solution by proton magnetic resonance indicated that substantially all of the 2-isopropenyl-2-oxazoline had been converted to a mixture of compounds corresponding to the following formulae:

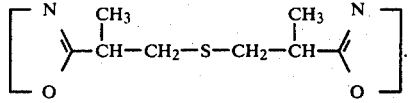

and

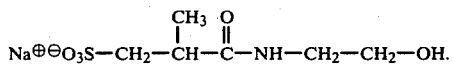

The compounds in this mixture underwent slow hydrolysis over a period of months to ring opened products.

EXAMPLE 3

To an aqueous solution of 2-isopropenyl-2-oxazoline homopolymer containing 2000 ppm of residual monomer was introduced sufficient sodium metabisulfite to generate a 200 percent molar excess of bisulfite ions relative to the monomer. After 12 hours at 20° C. less than 1 ppm of the monomer remained. Proton magnetic resonance indicated that the monomer had been converted to a salt corresponding to Formula I wherein M is -SO$_3^\ominus Na^\oplus$. This salt was observed to slowly hydrolyze to a salt corresponding to the formula Na$^\oplus \ominus$O$_3$S—CH$_2$—CH(CH$_3$)—C(O)—NH—CH$_2$—CH$_2$—OH.

EXAMPLE 4

To neat 2-isopropenyl-2-oxazoline (23 grams, 0.2 mole) was added at 20° C. with stirring 15.6 grams (0.2 mole) of mercaptoethanol over a period of about 10 minutes. The temperature of the medium after addition was observed to rise rapidly to 120° C. The reaction medium was stirred for an additional 1.5 hours and then was distilled at reduced pressure to remove any volatiles.

The product was a colorless, viscous liquid which had a mass of 38.3 grams. Analysis by proton magnetic resonance did not detect any protons on unsaturated carbon atoms. Fractional distillation of the crude product yielded at 127° C.–131° C. and 0.5 millimeter of Hg a 30.1-gram fraction consisting of an essentially pure compound corresponding to the formula

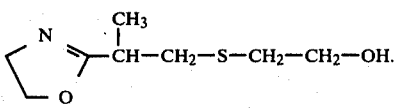

What is claimed is:
1. A process for reducing the level of 2-isopropenyl-2-oxazoline present in a polymer comprising the steps of:
(a) contacting at reactive conditions in a liquid medium the polymer containing the 2-isopropenyl-2-oxazoline with a protic acid, H-X, so as to produce the corresponding 2-isopropenyl-2-oxazolinium salt of the conjugate base of the acid; and
(b) contacting at reactive conditions the 2-isopropenyl-2-oxazolinium salt with a nucleophilic compound, H-M having a nucleophilic constant of greater than 5, so as to prepare a compound corresponding to formula I or formula II

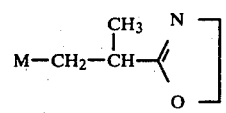

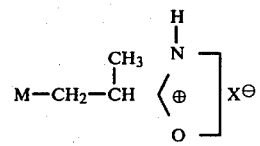

wherein M is the conjugate base of the nucleophilic compound H-M and X in Formula II is an anion derived from the protic acid.
2. The process as described in claim 1 wherein an aqueous liquid medium is employed.
3. The process as described in claim 2 wherein the protic acid is sulfuric acid.
4. The process as described in claim 2 wherein the nucleophilic compound is H$_2$S, HS—C$_2$H$_4$—SH, H$_2$SO$_3$, KHSO$_3$, NaHSO$_3$ or mercaptoethanol.
5. The process as described in claim 4 wherein the nucleophile and the protic acid are the same compound.
6. The process as described in claim 4 wherein a 100 percent excess of the nucleophile relative to the 2-isopropenyl-2-oxazoline is employed.
7. The process as described in claim 6 wherein the temperatue of the reaction medium during Steps (a) and (b) is in the range from about 0° C. to about 125° C.
8. The process as described in claim 2 wherein the nucleophilic compound is NaSH, Na$_2$S$_2$O$_3$ or pyridine.

* * * * *

UNITED STATES PATENT AND TRADEMARK OFFICE
CERTIFICATE OF CORRECTION

PATENT NO. : 4,357,464

DATED : November 2, 1982

INVENTOR(S) : Donald A. Tomalia & Timothy J. Adaway

It is certified that error appears in the above—identified patent and that said Letters Patent is hereby corrected as shown below:

Column 1, line 23, "vapor pressure unre-" should read -- vapor pressure of unre --.

Column 1, lines 49-54, that portion of the formula which reads

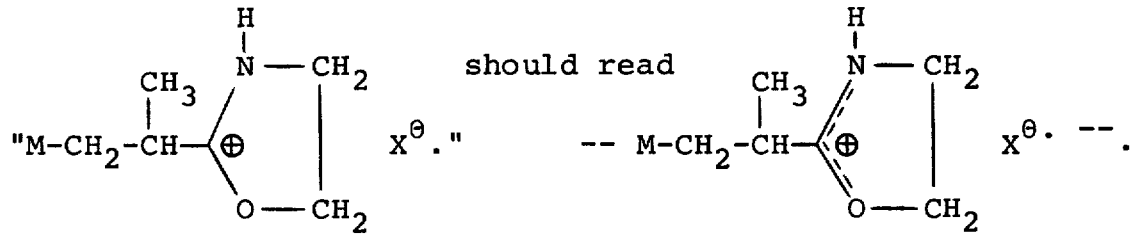

Column 2, line 24, "2-isopropeny-2-oxazoline" should read -- 2-isopropenyl-2-oxazoline --.

Column 2, line 35, "spaces about these polymers." should read -- spaces above these polymers. --.

Column 3, line 3, "menthanol at 25°C." should read -- methanol at 25°C. --.

Column 3, line 10, "2-isopropenyl-2oxazoline." should read -- 2-isopropenyl-2-oxazoline. --.

Column 3, line 33, "as a necleophilic compound" should read -- as a nucleophilic compound --.

Column 3, line 64, "They polymer" should read -- The polymer --.

UNITED STATES PATENT AND TRADEMARK OFFICE
CERTIFICATE OF CORRECTION

PATENT NO. : 4,357,464

DATED : November 2, 1982

INVENTOR(S) : Donald A. Tomalia & Timothy J. Adaway

It is certified that error appears in the above—identified patent and that said Letters Patent is hereby corrected as shown below:

Column 5, lines 7-11, that portion of the formula which reads should read

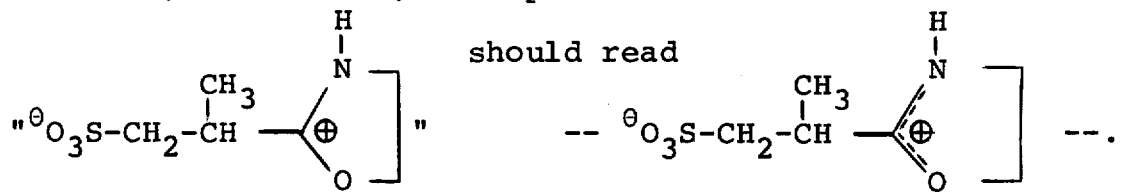

Column 6, lines 40-45, that portion of the formula which reads should read

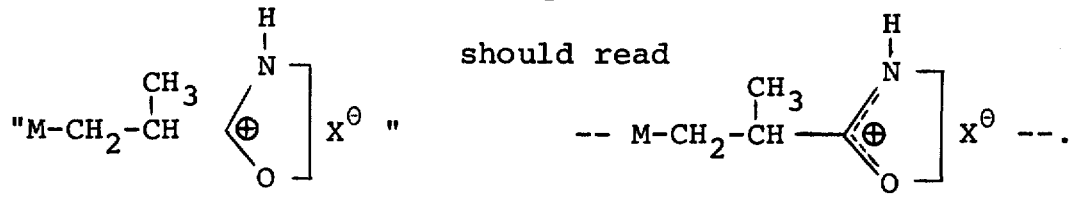

Column 6, line 63, "temperatue of" should read -- temperature of --.

Signed and Sealed this

Tenth Day of May 1983

[SEAL]

Attest:

Attesting Officer

GERALD J. MOSSINGHOFF

Commissioner of Patents and Trademarks